United States Patent [19]

Pforte

[11] Patent Number: 4,566,390
[45] Date of Patent: Jan. 28, 1986

[54] CODE-RESETTING DEVICE FOR A CAR-TYPE TRANSPORTER

[75] Inventor: Karl W. Pforte, Munich, Fed. Rep. of Germany

[73] Assignee: Buro Patent AG, Spielhof, Switzerland

[21] Appl. No.: 617,349

[22] Filed: Jun. 5, 1984

[30] Foreign Application Priority Data

Jun. 6, 1983 [CH] Switzerland ............. 3094/83

[51] Int. Cl.⁴ ............. B65G 47/48; B65G 47/50
[52] U.S. Cl. ............. 104/88; 198/353
[58] Field of Search ............. 104/88; 198/351, 352, 198/353, 354, 355

[56] References Cited

U.S. PATENT DOCUMENTS 3,502,038  3/1970  Wesener ............. 104/88
3,834,315  9/1974  Warner ............. 104/88
4,056,063  11/1977  Ritter ............. 104/88

FOREIGN PATENT DOCUMENTS 132220  10/1981  Japan ............. 198/353
584274  1/1947  United Kingdom ............. 104/88
2084775  4/1982  United Kingdom ............. 198/352

Primary Examiner—Robert B. Reeves
Assistant Examiner—David F. Hubbuch

[57] ABSTRACT

A circulating car conveyor has a code-resetting device at each code-reading station in which the resetting elements can be extended into the path of code-setting markers on the sides of the cars in a busy condition of the station, to hold the code-setting markers as the car continues to move past, thereby resetting the markers into an initial position and returning the cars to a starting point. The retaining member is resiliently biased against the code-setting markers or into the path with a force greater than that required to shift the marker along its guide but less than that required to transport the car along the path.

15 Claims, 7 Drawing Figures

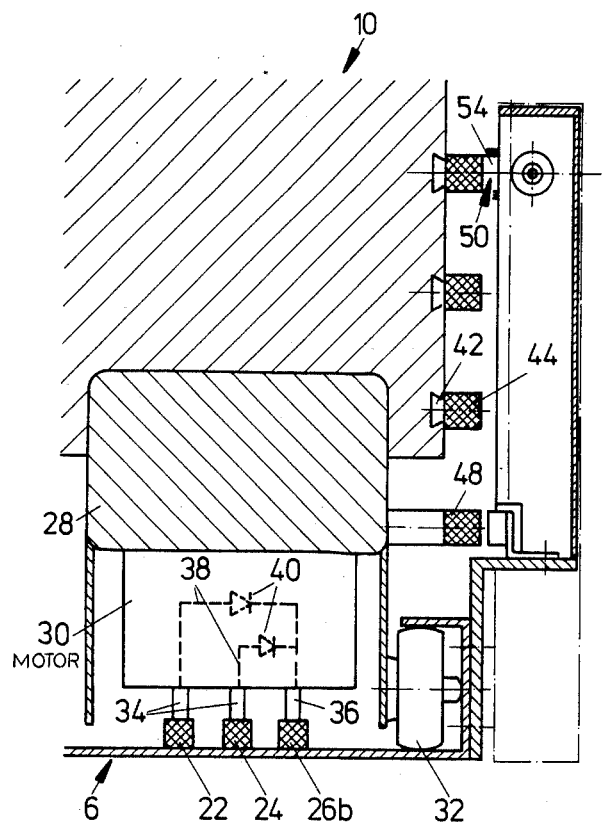
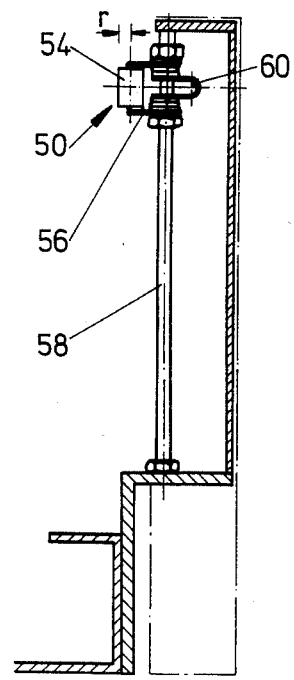
Fig. 4
Fig. 5
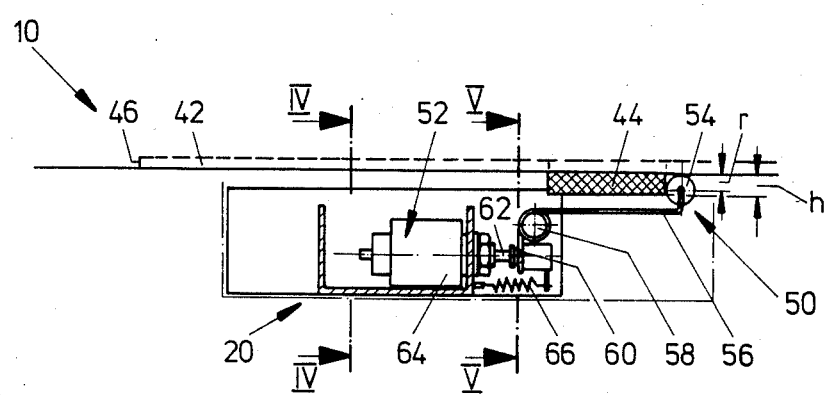
Fig. 3

CODE-RESETTING DEVICE FOR A CAR-TYPE TRANSPORTER

FIELD OF THE INVENTION

My present invention relates to a code-resetting device for a conveyor installation and, especially to a conveyor installation of the track type in which the code set on the vehicles or cars traveling along the track selects branches or stations at which the car is shifted from the main track.

The invention is especially directed to the resetting of code elements carried by such cars and particularly to code resetting or like units adapted to be positioned at the respective stations.

BACKGROUND OF THE INVENTION

Conveyor systems in which a substantially endless track is provided at one or more levels with horizontal, inclined or vertical stretches and cars or other vehicles travel along this track and are diverted from the track to various branches or stations have become of increasing importance in recent years and have gained widespread interest in a variety of applications, e.g. for the handling of articles, information and goods and, indeed, wherever an article must be transported from one station to another station along the track.

Typical uses of such installations are in mail-handling facilities in offices and in banks where generally the articles consist of documents, envelopes, packages or papers, or warehouses or factories where the articles may consist of parts to be assembled, inventoried or processed. Other applications of such installations will be readily apparent to the reader.

Existing installations of this type (see U.S. Pat. No. 3,636,883, for example) utilize a track which, for each station at which a car or vehicle can be removed from the track, consists of an arrival-and discharge-track stretch, a transfer station between this stretch and a main-track stretch from which the car can be shifted at this location assuming that a code set on a car matches the code designation for that station as determined by a code reader.

The coding of the car can be established by one or more movable members displaceable in movable guides parallel to the direction of travel and whose positions on the car with respect to a reference marker establish the code. The reference marker and code-setting member or members may be permanent magnets and the code reader at the station may be reed switches or other devices sensitive to the permanent magnets.

The code is usually carried on one side wall of the car and the transfer station between arrival-and discharge-track stretch and main-track stretch can be provided as a detecting station responsive to the position of the code-setting markers with respect to the reference marker.

When the track or siding of the station is filled, however, means responsive to the availability of space on this siding can be provided to prevent the transfer station from operating to feed additional cars thereto and, as a result, the car destined for a particular station is not diverted onto this siding, but rather is permitted to circulate until the siding becomes free again to receive this car.

Naturally, this may result in an undesired circulation of large numbers of cars unnecessarily and repeatedly, placing a significant load upon the system.

OBJECTS OF THE INVENTION

It is the principal object of the present invention to provide an improved automatic code-resetting system which will automatically reset the code markers to a predetermined position, e.g. a starting position for the code markers, upon the detection of a busy condition at the station or siding to which the originally set code directed a car.

Another object of this invention is to provide an improved conveyor whereby the drawbacks of the earlier system are obviated at comparatively low cost and with little difficulty.

It is also an object of this invention to provide an automatic code-resetting device which has especially simple construction and can be readily provided on a conveyor installation of the type described.

SUMMARY OF THE INVENTION

These objects and others which will become apparent hereinafter are attained, in accordance with the present invention, in a conveyor installation of the type described which is provided at each station with a code-resetting device having a respective member engageable with each code-setting marker along each adjustment path in the direction of travel which is shiftable into engagement with the code-setting marker and which bears upon the latter with a force greater than that with which the marker resists sliding along its path yet less than that with which the car travels along this path so that, as the code-setting marker is shifted into its resetting position by the travel of the car along the track, whereupon the movement of the car will be sufficient to carry the marker past the deflectable or yieldable retaining member.

In other words, each retaining member or abutment is deflectable either transversely only or both transversely and in the direction of travel of the car against a prestress force such that this prestressing force is greater than the resistance to sliding movement of the marker on the car, but less than the driving force of the car in the travel direction.

According to a feature of the invention, control means is provided to respond to a busy condition of the sliding associated with the transfer station for preventing the code-reading device provided at this station from transferring the car from the main track to the siding while means responsive to this busy-state detector is provided to actuate the resetting unit, i.e. to introduce the retaining abutment or retaining abutments into the path or paths of the car at each coding marker.

Specifically, this circuit means includes a code-reading device for each siding associated with a control device and normally constructed and arranged to effect the transfer of a car to the siding upon matching of the coding set by the markers on the car with the station designation, means responsive to a busy or out-of-service condition at this siding for disabling the transfer, and a code-resetting device located downstream of the code-reading device at this station which is responsive to the control unit and a busy-condition detector and/or an out-of-service switching unit to render the code resetter effective in the event the code reader and/or the transfer operation has been disabled.

It should be apparent that at the code-resetting device, a retaining abutment is provided which can be shifted from a retracted position out of the path of a code-setting marker on the car into the path of the latter but which does not have to be retracted out of the path again immediately after the marker has reached this starting or initializing position on the car. In the system of the present invention, the code-setting marker can nevertheless pass the retaining abutment even though the latter remains in its operative position because it is yieldable and is deflected by the code-setting marker as it is entrained past the latter, once it has been brought into its starting position on the car by the force with the car travels along the track. As a consequence, the construction of the resetting device is unusually simple and it can be utilized in a wide range of applications and in various locations on new or existing conveyor installations.

Where the car has two setting markers disposed one behind the other in the direction of travel of the car, each independently shiftable into respective positions and displaceable along a single guide of the car, only a single resetting abutment is required to position both markers at the starting point since the leading marker is initially engaged by the retainer and, as it is held back, the upstream marker is so engaged against the retained downstream marker and both markers are held as the vehicle moves past until the initializing position is reached.

In systems in which two or more such code-setting markers are provided in respective guides, one above another with the guides running in the direction of travel, it may suffice to provide only a single retaining abutment for one of the markers to bring it into its initial position and thereby establish a homing code for the vehicle. Preferably, however, a respective retaining abutment is provided for each such marker and the retaining abutments when two or more are provided are located in vertically spaced relationship.

I have found it to be advantageous to form the retaining abutment as a roller which is engageable with the code-setting marker, the latter projecting at a distance h from the wall of the car. In this case, the roller is held on a spring finger and has a radius r which is less than the height h of the code-setting marker. Naturally, other means for ensuring clean deflection of the retaining abutment can be utilized as well with, of course, less efficiency.

The roller can be mounted upon a spring finger or a spring finger can form the retaining abutment itself. When the roller is mounted on a spring finger, the spring finger can extend parallel to the direction of travel. When the spring finger itself engages the code-setting marker directly, it can be deflectable in the direction of travel, but may be interposed in the path of the code-setting marker by a transverse displacement.

In either case, the actuator for introducing the retaining abutment into the path of the code-setting marker is preferably an electromagnet which has an active position in which the retaining abutment is in this path and an inactive position in which the retaining abutment is withdrawn or retracted from the path. When a plurality of such retaining abutments are provided, the actuator can be coupled to operate them all simultaneously and can include a single electromagnet.

Of course, it is possible to provide a construction in which the electromagnet is actuated to withdraw the retaining abutment from the path of the code-setting marker.

It is possible, utilizing the present invention, to form the retaining abutment on or couple it with a mechanical lever which is actuated by the force or movement of the car itself and which can be coupled by a switchable clutch or other means with the retaining abutment. Electromotor drives with a slip clutch or unirotational clutch or even jaw clutch can be used. Best results are obtained, however, with the electromagnetic actuator.

Various arrangements of the code resetting device can utilize the principles of the invention set forth above. For example, a single collecting station can be provided to which unused cars can be returned and at which any coding can be reset. Preferably, however, the system utilizes the circuit at each station with the code resetter downstream of the code reader and responsive to the busy condition detector at the corresponding siding.

BRIEF DESCRIPTION OF THE DRAWING

The above and other objects, features and advantages of the present invention will become more readily apparent from the following description, reference being made to the accompanying drawing in which:

FIG. 3 is a cross-sectional view, from above, through the code-resetting device;

FIG. 4 is a vertical section diagrammatically illustrating the relationship of the code-resetting device to other elements of the conveyor, generally as taken along the line IV—IV of FIG. 3;

FIG. 5 is a section along the line V—V of FIG. 3;

SPECIFIC DESCRIPTION

Figure 1:
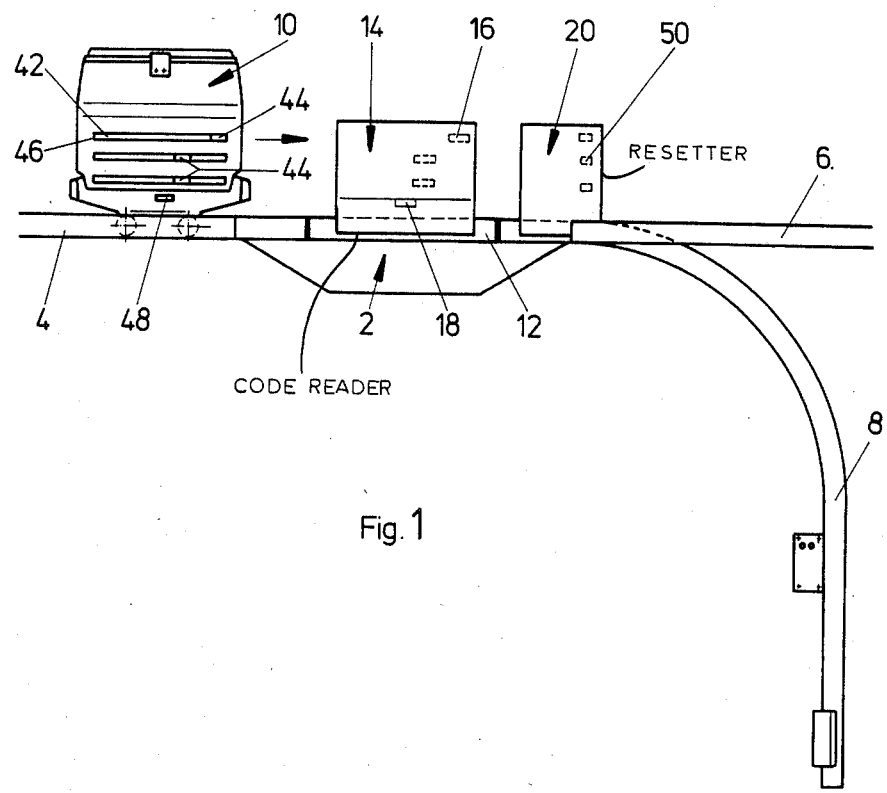
FIG. 1 is a side-elevational view of a conveyor installation according to the invention provided with a code-reading and transfer station having a code-resetting device according to the invention.
Figure 2:
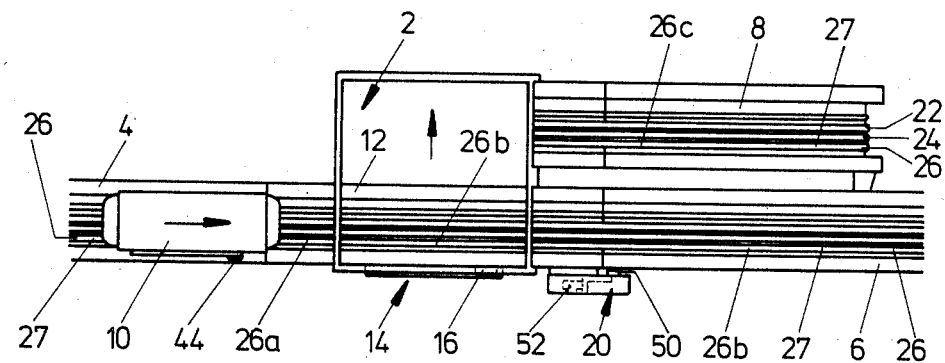
FIG. 2 is a plan view thereof.

The conveyor installation diagrammatically illustrated in FIGS. 1 and 2 comprises a transfer station 2 at which a car 10 traveling along the main line of the conveyor can be diverted. The track comprises an incoming stretch 4 leading to this station, an outgoing stretch 6 continuing along the endless track, and a siding 8 to which the car can be diverted. The station 2 is provided with a transfer carriage 12 carrying a section of the track and shiftable transversely to move a car 10 thereon into alignment with the siding 8.

Station 2 is provided with a code-reading device 14 which can be mounted upon the carriage 12 and which serves to read the code on the car 10. The code reading device 14 is provided with sensors 16, e.g. protective-gas read-switches or other contactless switches which are connected to a circuit for controlling the carriage. A further but similar sensor 18 serves to read a reference mark on the car so that the relative positions of the car and the reader can be established and hence the relative positions of the code markers on the car can be determined.

Along the track the stretch 6 downstream of the code reader 14, I provide a code-resetting device 20.

A conveyor installation also includes rails 22 and 24 for supplying the car with electric current and a control rail 26 which can deliver control commands to the car or can receive signals therefrom. The control rail 26 is subdivided into various control sections and can have, for example, the control rail sections 26a, 26b and 26c along the incoming track 4 at the station 2 and along the outgoing track 6 or the siding 8, respectively. The cars 10 circulate along the track by self-contained drive means.

While the details of the car construction are not relevant to the invention, it suffices to note that each car 10 has a chassis 28 which can be provided with an electric-drive motor 30 and wheels 32 which support the car on the channel-shaped track so that the car can travel vertically and/or horizontally.

Contact shoes 34 engage the current-carrying rails 22 and 24 while a further contact shoe 36 engages the control rail 26. The shoes are bridged for diodes 40 which ensure that only current on a predetermined potential is applied to the shoe 36, e.g. a positive potential, to establish the control functions.

Along one side of the car 10, code-setting markers 44 are provided with respective guides 42 which extend in the direction of travel and in the embodiment illustrated are disposed one above another. Each of these guides has an abutment 46 at the initializing or starting end of the guide. From this end position 46, the markers can be shifted to the right (FIG. 1) into selective positions which establish a code for selection of the stations 2 and can be sensed by the sensors 16 of the code reader. A reference marker 48 is also provided on the carriage at a fixed location. The fixed marker 48 is also sensed by the code-reading device unit 14 through sensor 18. Code markers 44 and the reference marker 48 can be permanent magnets designed to operate the reed switches.

The code-resetting device 20 comprises three retainer abutments 50 disposed in vertically-spaced relationship corresponding to the arrangement of the code-setting markers and each of these retaining abutments 50 can be thrust into or withdrawn from the path of the respective code-setting marker.

In the position illustrated in FIGS. 3-5, the retaining abutments 50 are shown in their active position, i.e. in the path of the respective code-setting marker 44 and in the position in which they will engage the code-setting marker and reset it against the abutment 46 at the initializing end of the respective guide 42. As each code-setting marker 44 is held back by the retainer as the vehicle continues to move the track, it will ultimately engage the abutment 46 at which point the continued movement of the vehicle will cause deflection of the retaining abutment 50 against a spring force to allow the continued movement of the car with the code-setting markers reset in the starting positions. This spring force or prestress upon the retaining abutment is greater than the force required to slide the code-setting markers 44 along the respective guides 42, but less than the drive force of the car.

In a preferred embodiment of the invention, each retaining abutment 50 comprises a roller 54 adapted to ride over the respective code-setting marker, but whose radius r is less than the height h of the code-setting marker. The roller 54 is mounted at the end of a lever 56 preferably formed as a spring-steel wire and which is pivotal about a fulcrum defined by a pin 58. The other arm of the lever 56 is engaged by or formed with an actuating-angle piece 60 which is connected pivotally to an armature 62 of a solenoid 64, the latter forming the actuator 52 which swings the roller into the path of the code-setting marker 44. A restoring spring 66 acts upon the armature to hold the abutment in its inactive position when the electromagnet 52 is deenergized.

In the embodiment illustrated, each of the code-setting marker 44 has such a retaining abutment 50 with its actuator 52 although only one such abutment and its actuator has been illustrated in detail. It is also possible to provide a single or common actuator 52 for all three retaining abutments 50, in which case the lever 56 is rigidly connected with the pin 58 which can be common to all three levers and can be displaced by only a single actuator 52.

Figure 6:
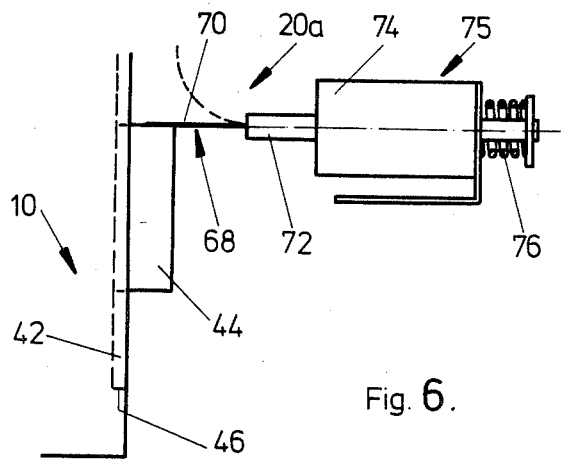
FIG. 6 is a view similar to FIG. 3 but illustrating another code-resetting mechanism according to the invention.

FIG. 6 illustrates another embodiment of the code reader 20a in which the retaining abutment 68 is formed by a leaf spring 70 connected to the armature 72 of an electromagnet 74 serving as the actuating device 75. A restoring spring 76 normally biases the retaining abutment 68 out of engagement with code-setting marker 44 and only upon energization of the solenoid 74 is the retaining abutment 70 brought into play, i.e. into the position illustrated. Once the code-setting marker 44 reaches the abutment 46 at the end of its guide 42, the leaf spring 70 is deflected into the broken-line position illustrated and the code-setting marker can continue past. In this embodiment as well it is possible to provide a roller at the end of the leaf spring.

Figure 7:
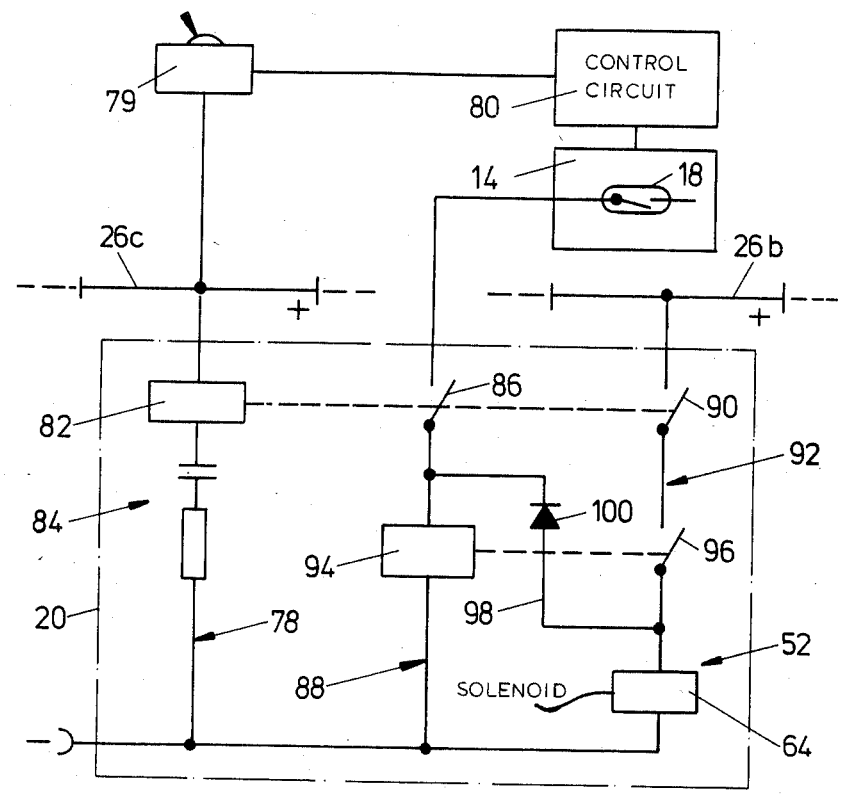
FIG. 7 is a circuit diagram illustrating aspects of the invention.

FIG. 7 shows a circuit which can be utilized for the reading and code-resetting systems of this invention and will be described along with the function of the station 2.

The code-resetting device 20 comprises a first circuit 78 which is connected with the control rail section 26c and which serves as a busy-condition detector for the particular siding 8. The circuit 78 is provided with a cutout 79 for the siding 8 and for the control circuit 80 which operates the transfer carriage 12 at the station 2.

When the sliding 8 is fully loaded with cars and a further car 10 arrives at the control-rail section 26c, a positive potential is applied by its shoe 36 to the control-rail section 26c to activate the busy-condition detection circuit 78. This includes a first relay 82 and a time-constant circuit 84 with which the response time of the first relay 82 can be established or set. The first relay 82, upon energization, closes a first switch 86 in a second circuit 88 and a second switch 90 in a third circuit 92. The second circuit 88 is connected to the code-reading device 14 to be activated by the sensor 18 when responding to the reference marker 48 of car 10. The second circuit 88 also includes a second relay 94 which, upon energization closes a third switch 96 in series with the second switch 90 of the third circuit 92.

The third circuit is connected with the control-rail section 26b which serves as the busy-condition detector and which is located in the region of the station 2 ahead of the code reader 14 and along outgoing rail 6 in the region of the code-resetting device 20. The third circuit 92 also includes the electromagnet 64 of the actuator 52 for the resetting device.

If the first and second circuits 78 and 88 are both activated by the presence of a car in the siding 8 on control rail section 26c and before the code reader 14, the second and third switches 90 and 96 of the third circuit 92 are closed and a current flows as a positive potential is applied by shoe 36 of the car to the control-rail section 26b, through a closed circuit including the solenoid coil 64 to effect resetting of the markers. A cross connection 98 connected to the third circuit 92 in series with the switches 90 and 96 is connected to the second circuit 88 between the switch 86 and the relay 94 and is provided with a diode 100, to form a holding circuit for the second relay 94 when the reference detector 18 opens circuits as the car passes the reader 14. Thus as long as the car is traveling through the station and is in the region of the code-resetter 20, the control rail 26b and the third circuit 92 remain active and the retaining abutments 50 in position to retract the code-setting markers with further travel of the vehicle.

When the car passes the control-track section 26b, the relay 94 is deenergized, electromagnet 64 is deenergized, and the retaining abutments 50 are withdrawn from their active positions.

Upon removal of a carriage from the siding 8, the control-rail section 26c becomes currentless so that the busy-condition signal is extinguished. The relay 82 returns to its rest position and thus the circuits are separated from one another and an oncoming car can be diverted to the siding if it carries the appropriate code. Naturally, if a car passes the reading station and is destined for another station whether or not a busy condition is in force, that car will be permitted to pass without resetting.

I claim:

1. In a conveyor installation wherein cars circulate along a track and each car is provided along a side thereof with at least one code-setting marker displaceable along a guide from a starting position at an end of said guide in the direction of travel of the car and stations are provided along the track with code readers responsive to the position of said code-setting marker and with means for transferring a car carrying the appropriate code representing a particular station to a siding from said track the improvement which comprises resetting means along said track including:

a retaining abutment displaceable in a direction transverse to the direction of movement of said marker along said guide into a position wherein said retaining abutment can intercept said marker and into a position wherein said retaining abutment is retracted from interception of said marker;

actuating means connected with said retaining abutment for shifting same from one of said positions into the other of said positions; and yieldable means acting upon said retaining abutment and effective with a force exceeding the resistance displacement of movement of said marker along said guide but less than the force with which said car travels along said track for yielding upon engagement by said retaining abutment with said marker and the shifting of said marker along said guide into said starting position by the movement of said car relative to said retaining abutment, whereby said marker thereafter clears said retaining abutment.

2. The improvement defined in claim 1 wherein said car is provided with at least two such markers in vertically-spaced relationship along said side, said markers being displaceable in respective guides, said resetting means including respective retaining abutments positioned to engage the respective markers and disposed in vertically spaced relationship.

3. The improvement defined in claim 1 wherein said retaining abutment includes a roller having a radius less than the height of said marker.

4. The improvement defined in claim 1 wherein said retaining abutment includes a leaf spring deflectable by said marker.

5. The improvement defined in claim 1 wherein said retaining abutment includes a member engageable with said marker, and a resilient arm extending parallel to the direction of displacement of said car carrying said member.

6. The improvement defined in claim 5 wherein said resilient arm forms part of a lever mounted for fulcromed pivotal movement.

7. The improvement defined in claim 6 wherein said actuating means includes an electromagnet operatively connected to said lever.

8. The improvement defined in claim 1 wherein said actuating means includes an electromagnet operatively connected to said retaining abutment for displacing same.

9. The improvement defined in claim 8, further comprising spring means operatively connected with said electromagnet for holding said retaining abutment in said retracted position in the deenergized state of said electromagnet.

10. The improvement defined in claim 1 wherein a plurality of retaining abutments are provided, each having a respective actuating means.

11. The improvement defined in claim 1 wherein a plurality of retaining abutments are provided with a common actuating means.

12. The improvement defined in claim 1 wherein said track includes a feed track upstream of said station, and a discharge track downstream of said station, said siding includes a siding track at said station for receiving cars from said means for transferring comprising a carriage displaceable between said siding track and said feed and discharge tracks, control means responsive to at least one of said readers for displacing said carriage upon the arrival of a car at said station bearing a proper code therefor, means responsive selectively to a busy condition of said siding track and to operation of a cutout device for enabling a car bearing the proper code to pass said code reader, said resetting means being provided on said discharge track downstream of said code reader and being responsive to said code reader and to said means responsive to said busy condition for selectively operating said actuating means said cutout device.

13. The improvement defined in claim 12 wherein said means responsive to said busy condition includes a first control-rail section on said siding track.

14. The improvement defined in claim 13 wherein said station and said discharge track are provided with a second control-rail section, said resetting means including a first circuit having a first relay connected with said first control-rail section and activated selectively upon the detection of a busy condition by a signal from said cutout device, said first relay having first and second switches, a second circuit in series with said first switch and connected to said reader and having a second relay, a third circuit in series with said second switch and a third switch operated by said second relay and including an electromagnet forming said actuating means and connected to said second control-rail section, and a cross connection between said third circuit in series with said second and third switches and connected to said second circuit between said first switch and said second relay and including a diode for holding said second relay.

15. The improvement defined in claim 14 wherein said first circuit includes a time-constant network for controlling the response time of said first relay.

* * * * *